(12) United States Patent
Carlson et al.

(10) Patent No.: US 10,645,175 B2
(45) Date of Patent: May 5, 2020

(54) PROXY DEVICE FOR ROUTING ELECTRONIC MESSAGES

(71) Applicant: Carneros Bay Capital, LLC, San Francisco, CA (US)

(72) Inventors: Mark Carlson, Half Moon Bay, CA (US); Gary Bender, San Rafael, CA (US); Robert Rutherford, San Francisco, CA (US); Patrick Stan, Pacifica, CA (US)

(73) Assignee: Cameros Bay Capital, LLC, San Francisco, CA (US)

( * ) Notice: Subject to any disclaimer, the term of this patent is extended or adjusted under 35 U.S.C. 154(b) by 19 days.

(21) Appl. No.: 15/939,895

(22) Filed: Mar. 29, 2018

(65) Prior Publication Data

US 2018/0288166 A1    Oct. 4, 2018

Related U.S. Application Data

(60) Provisional application No. 62/478,942, filed on Mar. 30, 2017, provisional application No. 62/489,404, filed on Apr. 24, 2017.

(51) Int. Cl.
*G06Q 20/20*    (2012.01)
*G06Q 30/02*    (2012.01)
*H04L 29/08*    (2006.01)
*H04L 12/707*   (2013.01)

(52) U.S. Cl.
CPC ......... *H04L 67/141* (2013.01); *G06Q 20/208* (2013.01); *H04L 45/24* (2013.01); *H04L 67/04* (2013.01); *H04L 67/28* (2013.01); *H04L 67/2804* (2013.01); *H04L 67/2861* (2013.01); *G06Q 20/20* (2013.01)

(58) Field of Classification Search
CPC ............. G06Q 20/3572; G06Q 20/202; G06Q 20/405; G06Q 20/34; G06Q 20/40145; G06Q 20/36; G06Q 20/409; G06Q 20/00; G06Q 20/20; G06Q 20/3276; G06Q 20/322; G06Q 20/3674; G06Q 30/0253; G06Q 20/401; G06Q 20/3821; G06Q 20/327; G06Q 20/40; G06Q 20/02; G06Q 30/20; G07F 7/086; G07F 7/0873; H04L 67/28; H04L 67/141; H04L 65/1069; H04W 12/06; G06F 21/35; G06F 21/43
See application file for complete search history.

(56) References Cited

U.S. PATENT DOCUMENTS

| | | | |
|---|---|---|---|
| 5,883,810 | A  | 3/1999  | Franklin et al. |
| 5,949,044 | A  | 9/1999  | Walker et al. |
| 7,844,550 | B2 | 11/2010 | Walker et al. |
| 8,332,323 | B2 | 12/2012 | Stals et al. |
| 8,380,177 | B2 | 2/2013  | Laracey |
| 8,626,593 | B2 | 1/2014  | Goldfinger et al. |

(Continued)

*Primary Examiner* — Sargon N Nano
(74) *Attorney, Agent, or Firm* — Kilpatrick Townsend & Stockton LLP

(57) ABSTRACT

In one embodiment, a system and method is provided to intercept an approval routing at a check-out and before the submission over the legacy routing system and before the starting of associated timers. Data identifying a customer account is routed over a different system for additional functions. Upon completion of the routing over the different system, the customer account data is submitted to the merchant POS to start the legacy approval routing.

11 Claims, 6 Drawing Sheets

(56) References Cited

U.S. PATENT DOCUMENTS

| | | | |
|---|---|---|---|
| 9,183,480 B1* | 11/2015 | Quigley | G06K 19/06196 |
| 9,208,481 B2 | 12/2015 | Arzumanyan et al. | |
| 9,224,141 B1* | 12/2015 | Lamba | G06Q 20/341 |
| 9,619,792 B1* | 4/2017 | Aaron | G06Q 20/227 |
| 9,741,026 B1* | 8/2017 | Grassadonia | G06Q 20/204 |
| 2007/0050751 A1* | 3/2007 | Husmann | G06F 9/465 |
| | | | 717/105 |
| 2011/0251892 A1* | 10/2011 | Laracey | G06Q 30/0253 |
| | | | 705/14.51 |
| 2012/0011063 A1* | 1/2012 | Killian | G06Q 20/105 |
| | | | 705/41 |
| 2012/0016799 A1* | 1/2012 | Killian | G06Q 20/20 |
| | | | 705/44 |
| 2013/0094042 A1* | 4/2013 | Hong | H04N 1/00938 |
| | | | 358/1.13 |
| 2013/0166402 A1* | 6/2013 | Parento | G06Q 20/20 |
| | | | 705/21 |
| 2014/0191028 A1* | 7/2014 | Laracey | G06Q 20/1085 |
| | | | 235/379 |
| 2015/0324766 A1* | 11/2015 | Park | G06Q 20/3572 |
| | | | 705/39 |
| 2018/0053157 A1* | 2/2018 | Roffey | G06Q 20/206 |
| 2018/0247233 A1* | 8/2018 | Subbaraj | G06Q 10/02 |
| 2018/0261051 A1* | 9/2018 | Ooi | G07F 19/2055 |

* cited by examiner

PROXY DEVICE FOR ROUTING ELECTRONIC MESSAGES

CROSS-REFERENCES TO RELATED APPLICATIONS

This application claims the benefit of U.S. Provisional Patent Application No. 62/478,942 filed Mar. 30, 2017, entitled "Proxy Device for Routing Electronic Messages", and U.S. Provisional Patent Application No. 62/489,404, filed Apr. 24, 2017, entitled "Proxy Device for Routing Electronic Messages," the disclosures of which are hereby incorporated herein by reference in their entirety.

BACKGROUND OF THE INVENTION

The present invention relates to electronic communication routing systems, and in particular Point of Sale (POS) systems.

There is a large infrastructure in the United States and elsewhere for routing messages from a POS device for approval of a payment card or other instrument. The U.S. has long used magnetic stripe card readers, and the changes to POS equipment to capture chip cards, contactless payment devices, biometric signatures and other payment methods is a slow and expensive ongoing process.

FIG. 1 is a block diagram illustrating a typical prior art POS authorization routing system. A user device 102 is presented for payment over a connection 104 to a merchant POS 106. For a brick and mortar merchant, this can be a POS with a card reader at a cash register. The connection can be by swiping a mag stripe card, inserting a chip card, waving a contactless card or smart phone, or other appropriately configured mobile device that can communicate with the POS device and provide credentials. For an online transaction, the user computer can connect over the Internet to a merchant server which acts like a POS device and collects the needed data and passes the data to the acquirer in an approved format. The merchant POS, after receiving the account number, expiration date, etc. and receiving transaction data from a cash register, web page, etc., submits the data for approval over another connection 108 to a merchant acquirer computer 110. The connection can be a dial-up phone line, a dedicated data line, the Internet, etc. The merchant acquirer 110 then routs the data over a proprietary network 112 (e.g., VisaNet) to the institution that issued the card/account (Issuing Bank/Member 114). If the card is valid, the transaction is within limits, and a fraud review is clean, issuer 114 sends their response to the authorization request (approval, declination or referral) back through the network (112) who routes the response to the merchant acquirer 110, then through connection 108 to merchant POS 106.

The entire process takes just a few seconds, or less, while the customer is waiting at the merchant's POS. Multiple timers 117, 119, 121 are typically set, at the merchant POS 106, at the merchant acquirer 110 and at the proprietary network 112. If any one of the timer times-out, there may not have been enough time for an approval, and the response will be a decline or some other action, such as a decision based on stand-in parameters when an issuer response isn't timely received. Typically the maximum allowed round trip timeframe is roughly 10 seconds or less.

The limited time has made it nearly impossible to offer other functions or options during the time allotted for all participants in the authorization request to respond. Some systems allow a user to perform actions on a user phone or computer before checkout, such as obtaining and substituting a token, such as a single use account number (see, e.g., Walker Digital U.S. Pat. Nos. 5,949,044 and 7,844,550, and Microsoft U.S. Pat. No. 5,883,810). A tokenization deployment, for example, may utilize a wallet application to initiate the credential substitution(s). Other proposed systems require new hardware or applications, such as for accepting a QR code. E.g., see U.S. Pat. Nos. 8,332,323 and 8,380,177. Some systems have been devised to intercept POS communications for record keeping purposes in parallel. See, for example, U.S. Pat. Nos. 8,626,593 and 9,208,481. However, holding up the transaction for additional functions or processing is typically not an option. There are tens of thousands of players in the payment eco-system, most of which focus on cards, cash and checks today. Areas that need to be addressed (to introduce a change to the process) include training of staff, back office support, exception processing, reporting, loyalty systems, accounting processes and procedures, etc.

BRIEF SUMMARY OF THE INVENTION

In one embodiment, a system and method is provided to intercept an authorization routing at a check-out and before the submission over the legacy routing system and before the starting of associated timers. Data identifying a customer account is initially routed over a different system in support of additional functions. Upon completion of the routing over the different system, information (including account data or other credentials) is submitted to the merchant POS to start the legacy approval routing.

In one embodiment, the account number can be provided in a form factor not accepted by the merchant POS (e.g., QR code or other indicia displayed on a smart phone and scanned, biometric signature, image or other indicia). The account number is converted into a form factor accepted by the merchant POS after routing over the different system for additional functions.

In one embodiment, an account identifier is obtained from a customer by a proxy device. The proxy device, for example, may have an associated scanner for scanning a QR code or other indicia on a smartphone display, biometric signature such as fingerprint, retina/iris, voice, etc. The QR and/or bar code data, or other unique identifier such as biometric signature is transmitted over a network (e.g., Internet) to the issuer of the account. In the case of a biometric signature, the signature will likely be converted to a recognizable form before being transmitted over a network. The QR code or other indicia may include additional data from the user device for other purposes, as it is not restricted to the limited fields available for an authorization request. The issuer may approve the use of the account number, and return an approval message along with an emulated, or tokenized, account number. The proxy device submits the emulated account number to the merchant POS for legacy approval routing. The emulated account number may be an emulated cryptogram for a chip card, or any other data package.

In one embodiment, an account identifier obtained from a customer is used to access additional functions over a network. For example, coupons, loyalty points, rewards, credits or other forms of payment value may be accessed. Also, real-time fraud protection measures could be implemented, such as sending an approval text message to the customers mobile phone for approval before the account data is submitted to the POS and before the timers are started.

DETAILED DESCRIPTION OF THE INVENTION

Overall System.

Figure 1:
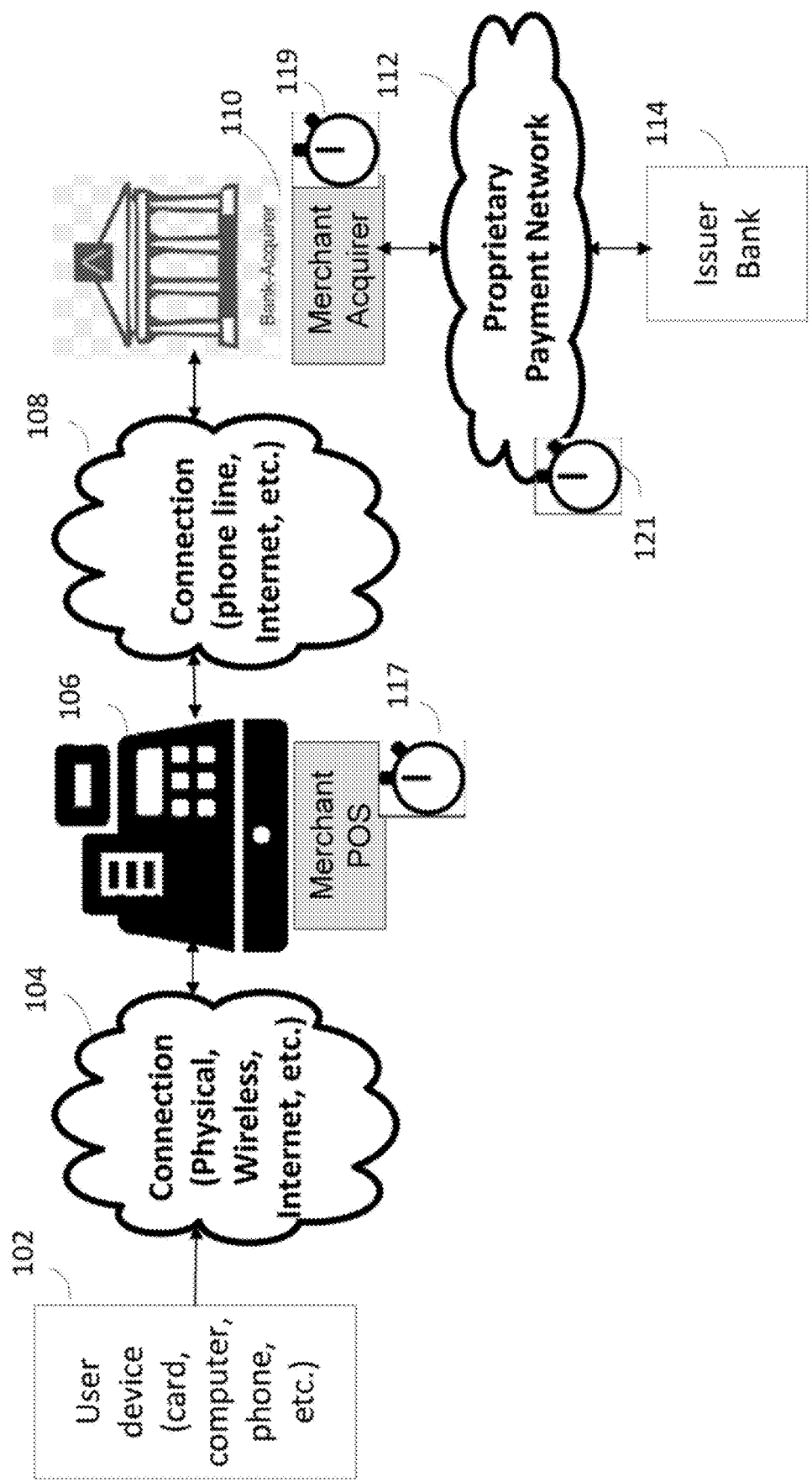
FIG. 1 is a block diagram of a prior art POS authorization routing system.
Figure 2A:
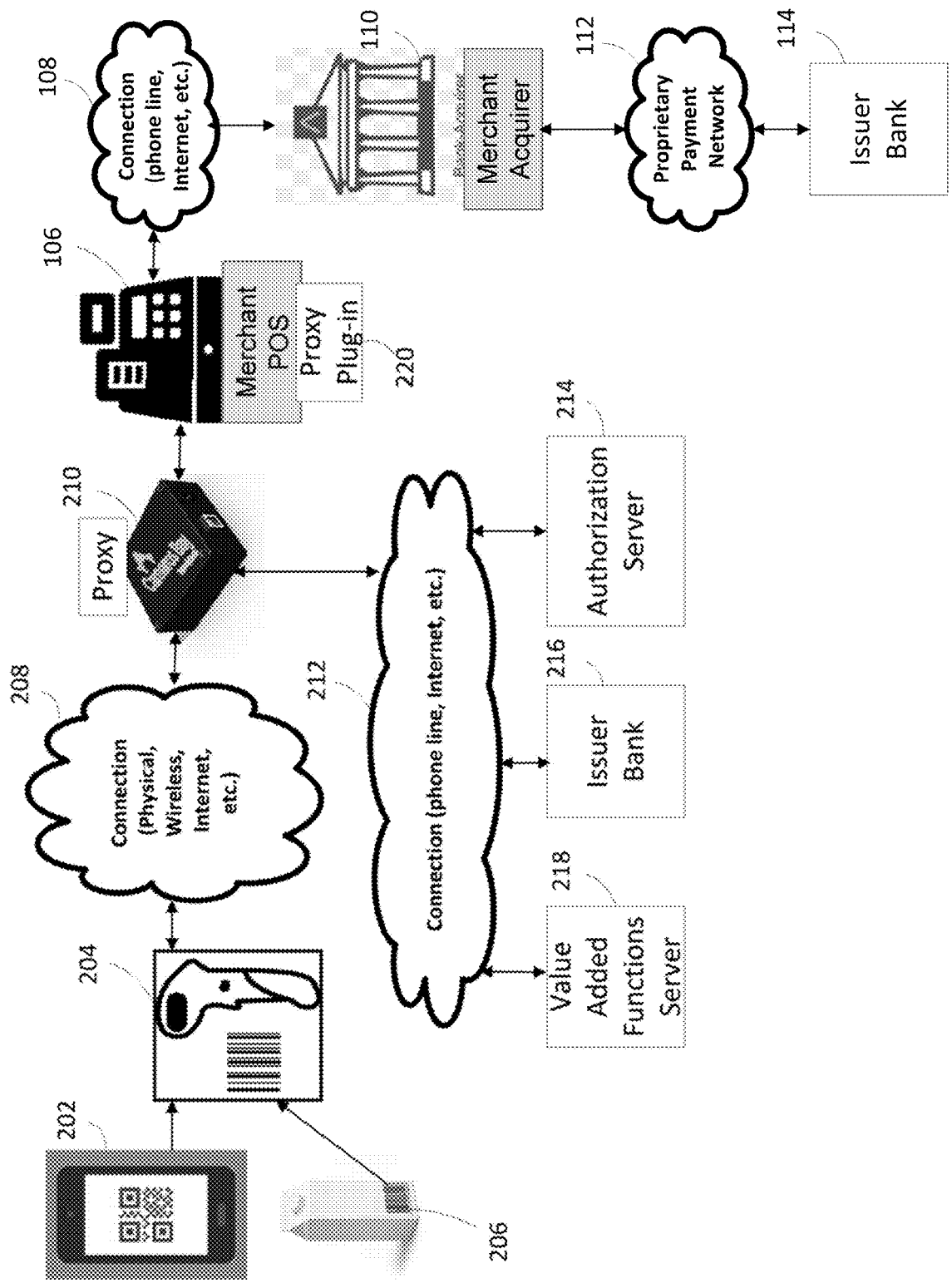
FIG. 2A is a block diagram of a proxy POS authorization routing system with a scanner and proxy according to an embodiment.

FIG. 2A is a block diagram of a proxy POS authorization routing system according to an embodiment. The system is interposed between the legacy system of merchant POS 106 through issuer bank 114 as shown in FIG. 1. A user device 202, such as smartphone, provides an account identifier and other data, shown encoded as a QR and/or bar code, or other unique indicia such as a biometric identifier or signature, on the smartphone display. As used herein, the indicia can be a QR or bar code, a biometric identifier or signature, a hologram or other image, or any other manner of encoding an account number or other identifier. A scanner 204 reads the QR code or other indicia and provides it over a connection 208 to a proxy device 210 (e.g., a matchbox computer). One or more product bar codes 206 (or QR codes) can also be scanned. The data can be provided to proxy device 210 over a wired connection, a wireless connection (e.g., Bluetooth® or RF transmission), a Local Area Network (LAN) or Wireless LAN (WLAN), the Internet, or any other connection. The account number can be for any type of account, such as credit, debit, pre-paid card, check. The scanner can also scan other elements than a QR code or other indicia, a paper check, a gift card, etc.

Figure 2B:
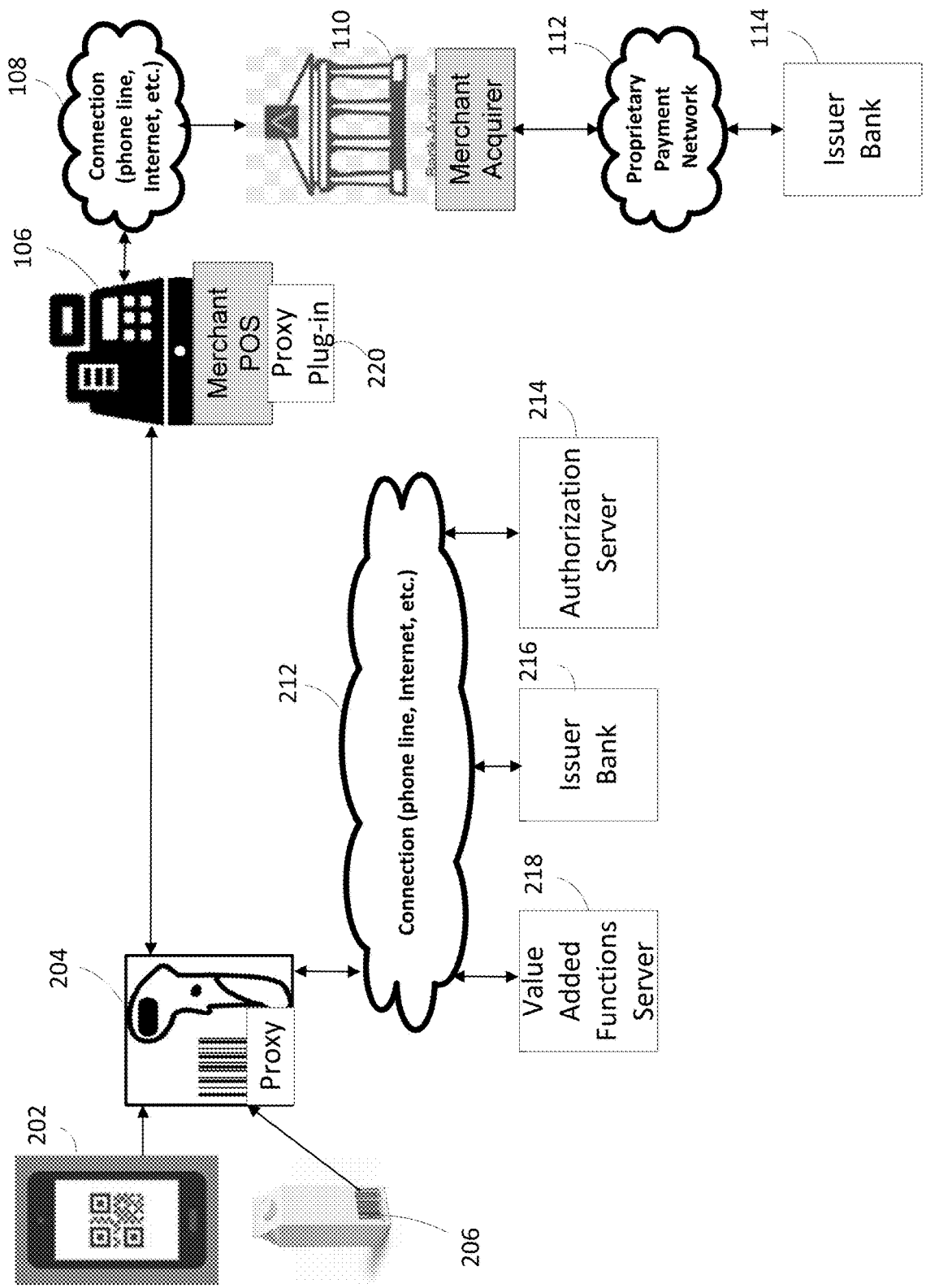
FIG. 2B is a block diagram of a proxy POS authorization routing system with a combined scanner/proxy according to an embodiment.

FIG. 2B is a block diagram of an alternate proxy POS authorization routing system with a combined scanner/proxy according to an embodiment. The scanner can include all the functionality, processing circuitry and memory of proxy device 210, thus eliminating the need for proxy device 210 and connection 208. The scanner could connect directly with connection 212 to the various servers and third parties, and can interface directly with merchant POS 106.

The proxy device 201 provides some or all of the data over a connection 212 to one or more of an authorization server 214, an issuer bank 216 or a value added functions or other server 218. Authorization server 214 may be a logical box housed externally from the proxy. That box performs a number of tasks; validates the information exchange (as much as it can), routes the message to the appropriate end point, monitors the end point response time (if warranted). Each proxy thus does not need to handle multiple routing decisions. Authorization server 214 may provide a way for an issuer that does not belong to proprietary network 112, or simply prefers a more flexible approach, to have its accounts accepted at the merchant POS 106. The account and other data may be routed directly to authorization server 214, which may authorize or may route to issuer bank 216 for authorization. Alternately, the data can be routed directly to issuer bank 216. The data may instead, or additionally, be routed to value added functions server 218 for one or more functions as described in more detail below, such as applying coupons or points or real-time fraud protection measures or apply a unique (line item) authorization functionality that can't be accomplished within the 10 second timeout of the legacy network system.

In one embodiment, the data from user device 202 includes an account number or card number. Alternately, authorization server 214 or issuer bank 216 may return an emulated account number, such as an token or one-time use account number, a bank account number, etc. Since the authorization server or issuer bank already has the data needed for settling the transaction, the account number can be a dummy account number that just needs to pass through the legacy system and be recognized as valid. Alternately, the account number passed through the legacy system can be used for settlement.

In one embodiment, the account number can be approved and passed to merchant POS 106 without first obtaining the transaction amount from the merchant POS. A variety of authorization and fraud metrics could be applied. For example, transaction counting (i.e. how many times did a "auto approval" take place over a period of time OR every "n" number of times, regardless of amount, a complete authorization would take place) or merchant types/locations could be blocked. Alternately, the transaction amount can be obtained in a variety of ways and included in the data sent to authorization server 214 and/or issuer bank 216 for approval.

Proxy Plug-in Mode

In one embodiment, a proxy plug-in module 220 (code, widget, app, etc.) can be downloaded to the merchant POS device 106 to intercept or redirect the "accept payment" message normally sent to an attached, legacy POS card reader. Instead, the plug-in 220 controls the communication with the proxy device 210. The type of communication depends upon the capabilities of the merchant POS device 106. If the merchant POS device 106 is connected to a Local Area Network (LAN) or Wireless LAN (WLAN), the proxy device 210 and scanner 204 can also be connected to the same network. The plug-in 220 then communicates through the network using the POS device network connection. Alternately, some POS devices may have Bluetooth® capability, and a Bluetooth® connection to the proxy device can be used. Other options, such as for older devices without a network connection, could include messaging over the power lines using power line networking adapters.

Process Flow

Figure 3:
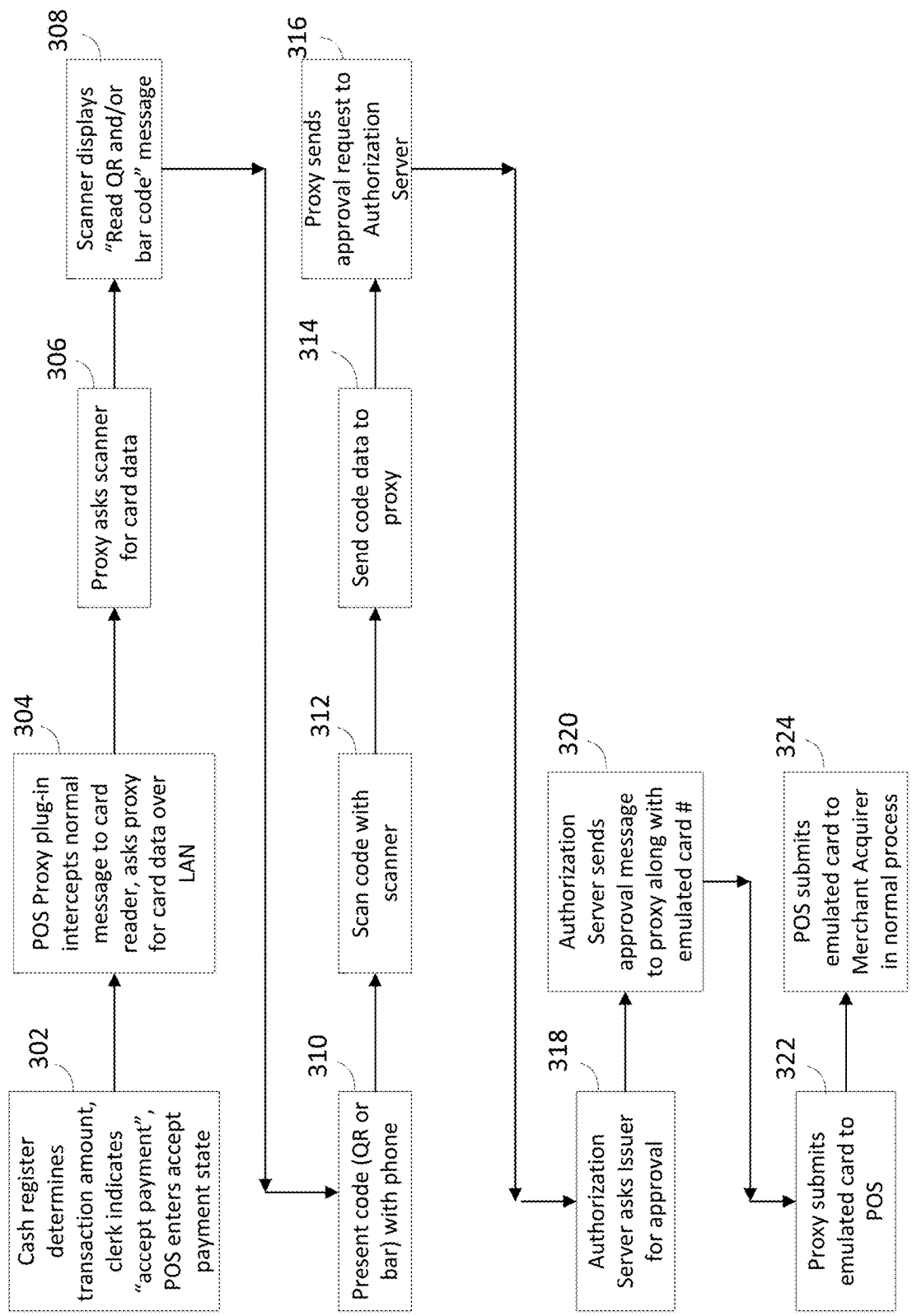
FIG. 3 is a flow chart of a proxy POS authorization routing sequence according to an embodiment.

FIG. 3 is a flow chart of a proxy POS authorization routing sequence according to an embodiment. A clerk operates a cash register to ring up items and determine a transaction amount (302). The clerk indicates "accept payment" and the POS enters an accept payment state. The POS Proxy plug-in 220 intercepts the normal message to a card reader, and asks proxy 210 for card data over a LAN (304). The proxy device then asks the scanner for card data (306). The scanner displays a message "Read QR code" (308) for the clerk (or read other indicia). The customer then presents a QR code or other indicia corresponding to an account on the user's smartphone (310). The clerk scans the QR code or other indicia (312).

The scanner sends the QR code or other indicia to the proxy device (314). The proxy devices sends the data as an approval request to the authorization server (316), which handles the routing and connects to other services as needed to validate the information (valid end point, information is protected (encrypted appropriately), formats message (if needed). Such service(s) then connect to a valid end point and route the message. The service monitors the response (timely, etc.) and logs the data. On the return, the system reverses the process. For example, the Authorization server or other service routes the message to issuer bank 216 for approval (318). The Authorization server receives a reply approval message, and sends it to the proxy device along with an emulated card number, from either the issuer or authorization server (320). The proxy device 210 then submits the emulated card number to merchant POS 106 for processing (322). The merchant POS then submits the emulated card number to the merchant acquirer for approval over the legacy system (324).

Scanner

Figure 4:
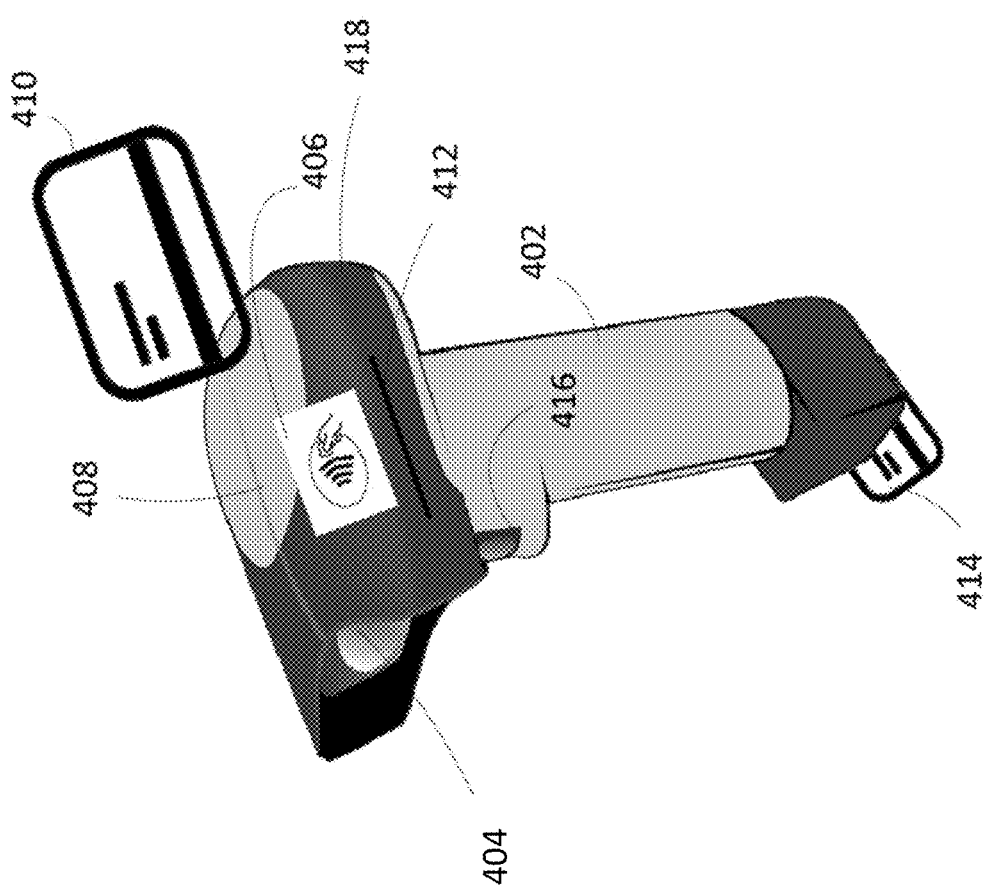
FIG. 4 is a diagram of a scanning device according to an embodiment.

FIG. 4 is a diagram of a scanning device 402 according to an embodiment. An off the shelf scanner can be used for the basic functions of working with proxy device 210 as described above. Alternately, an enhanced scanner can have one or more of the additional functions shown in FIG. 4 for enhanced functionality. A scanner 404 is provided, which may also include a camera. The scanner may also have one or more of a variety of other features. A contactless interface 406 is provided (e.g., NFC such as RFID). This interface can be used to receive a contactless card information from a user's contactless card or phone or other device. Alternately, or in addition, contactless interface 406 may be used to provide an emulated contactless account number to a contactless interface on the merchant POS.

The scanner also includes a traditional mag stripe reader slot 408 for swiping a mag stripe card 410. In addition, a chip card slot 412 is provided to accept a chip card. Additionally, a chip card contact 414 may be provided to simulate a chip card for interfacing with an unmodified, legacy merchant POS reader. The scanner can be moved so that contact 414 is inserted into the chip card reader to transfer the emulated chip card account data.

The scanner has a trigger 416 for operating the QR code or other indicia or bar code scanner. Alternately, or in addition, it can operate the camera. For example, a quick depression may operate the camera, while a longer holding of the trigger enables the scanner. A display 418 is also provided to give feedback to the user, and may include a simple touch screen interface.

The scanner can have a power cord, or could be wireless with a battery. The scanner can be used away from a check-out location, such as at a table in a restaurant. The scanner can scan a QR code or other indicia for payment, a product QR code or bar code, a coupon QR code or barcode, etc. The scanner may include a camera which can be used for various authentication and data collection purposes. For example, the camera can take a picture of the user's face, and send that over connection 212 to authorization server 214 for routing to a database containing the real customers identification photo for comparison. Also, a picture of the product itself, or a loyalty card, or any other data can be captured. The scanner may timestamp the data and provide GPS or other location data to enable Location Based Services (LBS).

Legacy POS Mode Without Modification

In one embodiment, scanner 204 is equipped with an NFC chip and antenna for contactless transactions, and/or a card-like extension with a connector for chip card emulation. For a contactless transaction, the scanner is waved near the contactless terminal. A transaction is started, with the trading of encryption keys and the passing of the transaction amount to the scanner. Once the scanner has the transaction amount, it can transmit that data to the proxy device 210, which then does the communications as described above, obtaining a contactless card number or identifier. This data is then send to the scanner to use to complete the contactless transaction. If the contactless messaging has timed out, a retry can be done. This will involve new encryption keys, etc., but now the scanner has the card number data, and can immediately provide the encrypted message to the POS reader. The POS reader then processes the transaction as it would for any contactless card.

For a chip card emulation, a connector 414 at the bottom of the scanner can be plugged into the card reader. As for a contactless transaction, it does a message exchange with the POS reader and transmits the transaction amount to the proxy device. Again, if the transaction times out, the connector can be removed and re-inserted, after the scanner has the transaction amount, with a new set of encryption keys, etc. being used.

For an EMV transaction a cryptogram is uniquely formed for each transaction which can only be validated by the card issuing bank. This cryptogram is generated by the chip in the card using the following information:

Transaction amount
Transaction date and time
Transaction counter that increments with every transaction
Card number and cards sequence number
A random number for the transaction The chip has a key that will generate the cryptogram using the above information and will be sent along with the information. Additionally the information includes details such as terminal verification results and card verification method. Once the issuer validates the cryptogram, a response cryptogram is generated using the transaction authorization response data and is sent back to the terminal and to the card. Only the chip will be able to validate this cryptogram.

Value Added Functions

In one embodiment, various value added functions can be performed that could not otherwise be performed because of the short timeout period once an account number has been submitted for approval.

Real-time fraud prevention. While there has been a lot written about providing alerts to customers' mobile phones and requiring authorization from the customer, there has been limited implementation because the time required would be longer than the approval timeout in the existing legacy infrastructure. By performing such functions before the account number is submitted for approval, they can be performed before the timers start. Thus, for example, a text message could be sent to the user's mobile device and could wait for a user reply before enabling the account number to be submitted. An application on the phone for presenting a QR code or other indicia of the emulated or real account number could inhibit the display until the fraud function confirms receipt of the confirmation from the user. That confirmation can be a return text message, or a communication through a website to the user's phone, or any other communication method. Other fraud functions could be performed, such as comparing the account number to a white list of approved numbers or a blacklist of potentially fraudulent or stolen numbers. In one embodiment, the whitelist and blacklist are stored on proxy device 210. Alternately, the lists may be stored at authorization server 214, issuer bank 216, or another connected server or computer. There would also be time for velocity checking and a variety of other fraud detection functions.

Loyalty, Offers, Coupons, Points. In one embodiment, coupons, points, or other loyalty features could be applied and included in the QR code or other indicia submitted to the proxy device. These can be based on a variety of factors, such as the particular account being used, the particular merchant, the particular items the customer is purchasing (where the barcodes have been scanned by the scanner), the total amount, etc. Embodiments also support a fully automated coupon process (at the line item—basket detail). Each line item (i.e. bar/QR code of the item being purchased) is compared against a valid discounts stored on the proxy server. The value added server would then send reconciliation to the various entities. These functions can be applied where a legacy merchant POS is used without modification. The customer can pay the full value at the legacy merchant POS, while value added functions server 218 can communicate with the computer of the loyalty feature to cause a credit to be separately sent to the customer's account. In another embodiment, the loyalty data is returned to proxy device 210, but not provided to the merchant POS or used to discount the transaction. Instead, proxy 210 communicates with user device 202 (e.g., smartphone) to provide the credit to an application on the user device. This can be done directly by a WiFi, Bluetooth® or other link directly between proxy device 210 and user device 202, or through scanner 204.

In one embodiment, coupon or other loyalty data is returned to the proxy device and then to an application on the user device. The user device application can then display a barcode or QR code for that loyalty discount, coupon, etc. That display can then be scanned by the merchant's normal coupon scanner. Prepaid cards or gift cards can also be scanned for a barcode or QR code. Alternately, a camera is provided in the scanner, and image recognition software detects the card number and the merchant for a closed loop gift card.

Customer applications. The proxy device enables a routing path for data to be added to user applications, such as the Mint.com personal finance application for tracking consumer spending. A customer could register with authorization server 214, and provide custom settings for that user's use of different account numbers. One setting could be providing or selecting the URL of Mint.com along with the user's login information and password to enable the automatic updating. Alternately, the transaction amount, merchant ID and other information in the data exchange between proxy device 210 and merchant POS 210 could be communicated directly to an application on the user device 202. As noted above, the communication can be directly from proxy device 210 or through scanner 204. The application on the user device can communicate with a Mint.com or other application on the user device to provide the data.

Issuer applications. The proxy device gives an account issuer flexibility to obtain information and perform functions beyond the capabilities of the legacy approval system, while still using the legacy approval system. The additional data can be received from the user device 202 by the proxy device 210 and routed through the independent connection 212. For example, the issuer may want the user device GPS location for fraud services or for providing loyalty program features.

Secondary market. A scanned check or other account can be settled through an intermediary that purchases the transaction from the merchant, and assumes the risk of collection (similar to current check-out processes where a third party will "buy" a check).

QR Code or Other Indicia

In one embodiment, the QR code or other indicia provided on the user device for scanning and delivery to proxy device 210 includes one or more of the following data:

Account number, encrypted account number, alias, token, CVV, dCVV, expiration date, chip card cryptogram, etc.

Loyalty information such as offers, coupons, points or coupon or points redemption request.

Whitelist or blacklist items available or not available for purchases.

User authentication information such as biometric data, password, PIN, photo, recent transactions, etc.

Ad tracking data.

Connection data for initiating a two-way communication channel with the user device, such as a Bluetooth® connection between the user device and the scanner.

consumer status (e.g., VIP, loyalty program, gold level vs. silver level etc.).

Information about the issuer or other institution.

Product information (i.e. Corporate card (aka travel card), Customer "since" data (e.g., off line authorization, stand in parameters).

GPS, Device info.

In one embodiment, multiple QR code or other indicias could be scanned to provide additional information. Alternately, a bar code could also be provided on the same or subsequent display. A QR code or other indicia could have encoded within it an instruction to scan again for a second or subsequent QR code or other indicia, and can rapidly present the additional QR or other code. The scanner may prompt the operator on a display to scan again. This technique could be used for more QR code or other indicia data and/or additional QR code or other indicias for stored coupons, UPC codes of products in a customer's cart, etc.

Application on Customer Device

In one embodiment, an application on the user device 202 not only provides the account number QR code or other indicia, but can perform other functions.

Self check-out. In one embodiment, the customer device application communicates with a camera application with a scanner capability. As the customer walks through a store, once they find an item to purchase, they scan the item and put it in a cart. At check out (human or automated) they present a barcode which says what items are in their cart. The cashier can verify that the items in the cart match or trust the customer for an automated check-out. The bar code contains the items, or is a URL where the items descriptions (SKU or UPC) are located. The proxy device looks up the items and associated prices, such as by accessing a website through connection 212 (e.g., the Internet). The proxy device can then calculate a total to present to the merchant POS 106.

In one embodiment, a customer may be automatically restricted from buying certain items based on the bar code and user information. For example, if the customer data indicates the customer is a minor, alcohol and cigarette purchases may be blocked. In another example, line item data (aka basket data) can be subject to authorization to preclude purchasing certain items. For example, this can cover situations where it would otherwise be a valid transaction when the cardholder shops at, e.g., a Wal-Mart store (hence MCC blocking would not preclude the transaction). If the cardholder wanted to purchase a firearm, or ammunition, that could be blocked with a line item authorization. Additionally, some account issuers may wish to preclude alcohol, pornography, etc., perhaps also based on location (e.g., country, dry county). Additionally, proxy device 210 could communicate with a merchant website through connection 212 to inform the merchant's security officer of the attempted purchase. Similarly, gun purchases may be conditioned on online access to a customer certification.

Coupons.

The customer presents another QR code or other indicia that contains a list of coupons. Coupons have been scanned in by the customer or added by the merchant, product provider or a 3rd party. The QR code or other indicia contains the coupons directly or a URL on where the location is. The list of coupons are verified against the list of items and applied if present.

Proxy Hot Spot.

The proxy device 210 can be configured as a WiFi hotspot. Certain approved applications on the user device can use the hotspot to connect to the Internet as needed for features related to the interaction with the proxy device, such as those described above.

Digital Wallet.

The user application may have a digital wallet with different accounts or payment types, or may interface with another digital wallet. Information returned by the proxy device may include, for example, points or coupons available for a particular account in the wallet. That account could automatically be selected, or the user can be prompted with an indication of the advantage for that or other accounts. Because a connection to the Internet may be assured through the proxy device, the user can use wallet and other services at check-out locations where there is otherwise not a strong enough signal.

Check-in.

In one embodiment, an application for checking into a bar, restaurant, store, etc. can be provided, or can link to an existing application. The proxy device and scanner can be used to provide the check-in as an alternative to a connection from the user device through the Internet to the bar or other merchant. A server could scan a QR code or other indicia on the user device when the customer first enters or is served at the bar or other establishment.

Tracking.

In one embodiment, an application on the user device tracks ads the user views in a browser on the user device, or ads in applications, text messages, or otherwise presented to the user. When a barcode for an advertised product is subsequently detected, the tracking information can be provided to the merchant, manufacturer, ad service, etc. This data can be provided through the proxy device, or independently from the user device to a website, via a text message, etc. In one embodiment, the tracked ads are provided to a cookie, or directly to an application, or the information is provided to an API of the merchant, manufacturer, ad service, etc. The product in an ad can be identified as being purchased (the missing link in systems today) by matching the description to a UPC or SKU or other product identifier at the POS. In one embodiment, the user enables a tracking application to connect to the phone's browser, text message application, email or other application or service necessary to capture viewed ads.]

Computer Systems for Client Server System

Figure 5:
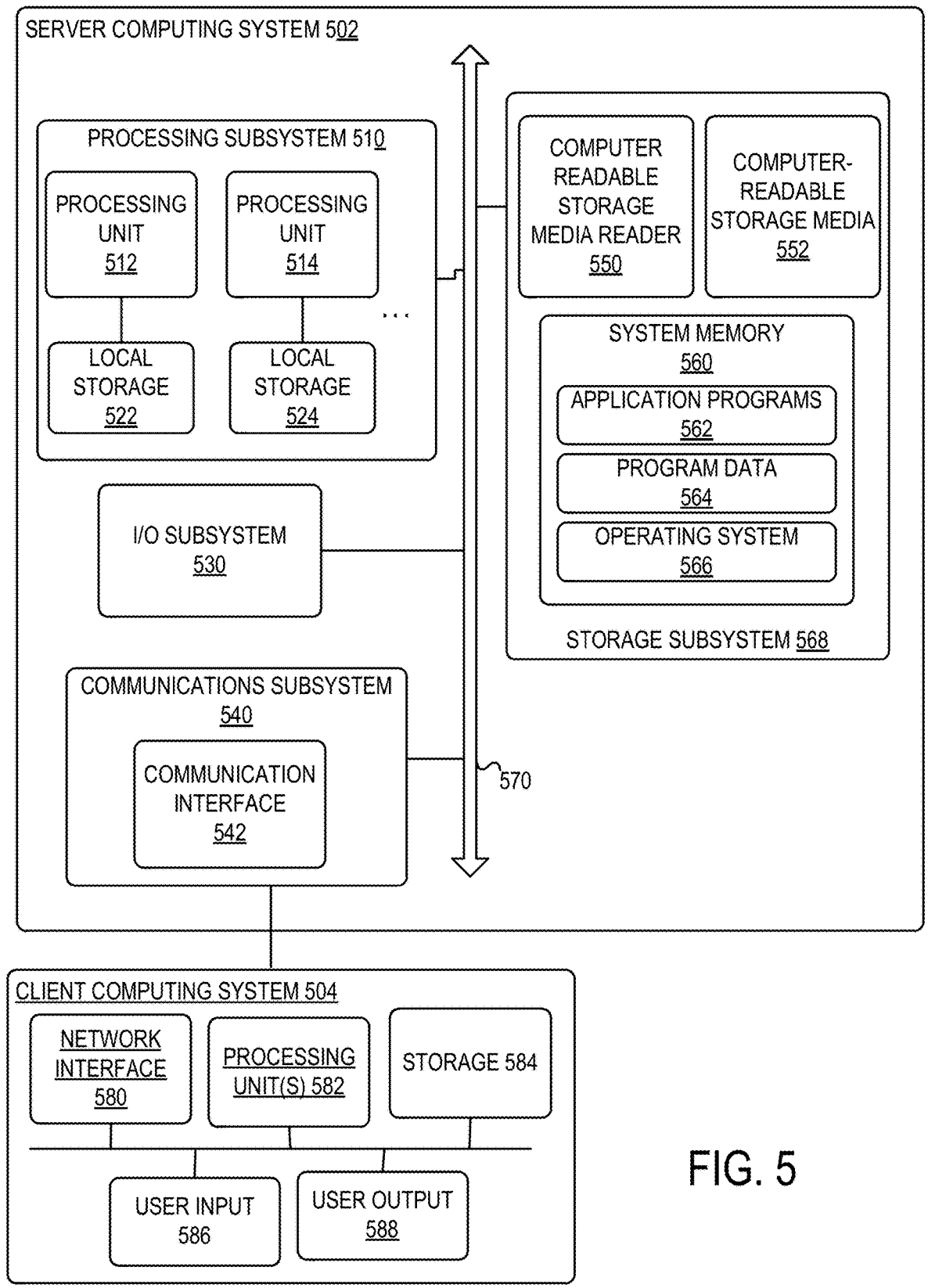
FIG. 5 is a simplified block diagram of a computing system and client computing system according to an embodiment.

Various operations described herein may be implemented on computer systems. FIG. 5 shows a simplified block diagram of a representative computing system 502 and client computing system 504 usable to implement certain embodiments of the present invention. In various embodiments, computing system 502 or similar systems may implement the cleaning robot processor system, remote server, or any other computing system described herein or portions thereof. Client computing system 504 or similar systems may implement user devices such as a smartphone or watch with a robot cleaner application.

Computing system 502 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 502 may include processing subsystem 510. Processing subsystem 510 may communicate with a number of peripheral systems via bus subsystem 570. These peripheral systems may include I/O subsystem 530, storage subsystem 568, and communications subsystem 540.

Bus subsystem 570 provides a mechanism for letting the various components and subsystems of server computing system 504 communicate with each other as intended. Although bus subsystem 570 is shown schematically as a single bus, alternative embodiments of the bus subsystem may utilize multiple buses. Bus subsystem 570 may form a local area network that supports communication in processing subsystem 510 and other components of server computing system 502. Bus subsystem 570 may be implemented using various technologies including server racks, hubs, routers, etc. Bus subsystem 570 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 530 may include devices and mechanisms for inputting information to computing system 502 and/or for outputting information from or via computing system 502. In general, use of the term "input device" is intended to include all possible types of devices and mechanisms for inputting information to computing system 502. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 502 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 510 controls the operation of computing system 502 and may comprise one or more processing units 512, 514, etc. A processing unit may include one or more processors, including single core processor or multicore processors, one or more cores of processors, or combinations thereof. In some embodiments, processing subsystem 510 may include one or more special purpose co-processors such as graphics processors, digital signal processors (DSPs), or the like. In some embodiments, some or all of the processing units of processing subsystem 510 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 522, 524. Any type of processors in any combination may be included in processing unit(s) 512, 514.

In some embodiments, processing subsystem 510 may be implemented in a modular design that incorporates any number of modules (e.g., blades in a blade server implementation). Each module may include processing unit(s) and local storage. For example, processing subsystem 510 may include processing unit 512 and corresponding local storage 522, and processing unit 514 and corresponding local storage 524.

Local storage 522, 524 may include volatile storage media (e.g., conventional DRAM, SRAM, SDRAM, or the like) and/or non-volatile storage media (e.g., magnetic or optical disk, flash memory, or the like). Storage media incorporated in local storage 522, 524 may be fixed, removable or upgradeable as desired. Local storage 522, 524 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 512, 514 need at runtime. The ROM may store static data and instructions that are needed by processing unit(s) 512, 514. The permanent storage device may be a non-volatile read-and-write memory device that may store instructions and data even when a module including one or more processing units 512, 514 and local storage 522, 524 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 522, 524 may store one or more software programs to be executed by processing unit(s) 512, 514, such as an operating system and/or programs implementing various server functions such as functions of UPP system 102, or any other server(s) associated with UPP system 102. "Software" refers generally to sequences of instructions that, when executed by processing unit(s) 512, 514 cause computing system 502 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 512, 514. In some embodiments the instructions may be stored by storage subsystem 568 (e.g., computer readable storage media). In various embodiments, the processing units may execute a variety of programs or code instructions and may maintain multiple concurrently executing programs or processes. At any given time, some or all of the program code to be executed may be resident in local storage 522, 524 and/or in storage subsystem including potentially on one or more storage devices. Software may be implemented as a single program or a collection of separate programs or program modules that interact as desired. From local storage 522, 524 (or non-local storage described below), processing unit(s) 512, 514 may retrieve program instructions to execute and data to process in order to execute various operations described above.

Storage subsystem 568 provides a repository or data store for storing information that is used by computing system 502. Storage subsystem 568 provides a tangible non-transitory computer-readable storage medium for storing the basic programming and data constructs that provide the functionality of some embodiments. Software (programs, code modules, instructions) that when executed by processing subsystem 510 provide the functionality described above may be stored in storage subsystem 568. The software may be executed by one or more processing units of processing subsystem 510. Storage subsystem 568 may also provide a repository for storing data used in accordance with the present invention.

Storage subsystem 568 may include one or more non-transitory memory devices, including volatile and non-volatile memory devices. As shown in FIG. 5, storage subsystem 568 includes a system memory 560 and a computer-readable storage media 552. System memory 560 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 502, such as during start-up, may typically be stored in the ROM. The RAM typically contains data and/or program modules that are presently being operated and executed by processing subsystem 510. In some implementations, system memory 560 may include multiple different types of memory, such as static random access memory (SRAM) or dynamic random access memory (DRAM). Storage subsystem 568 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 568.

By way of example, and not limitation, as depicted in FIG. 5, system memory 560 may store application programs 562, which may include client applications, Web browsers, mid-tier applications, relational database management systems (RDBMS), etc., program data 564, and one or more operating systems 566. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 552 may store programming and data constructs that provide the functionality of some embodiments. Software (programs, code modules, instructions) that when executed by processing subsystem 510 a processor provide the functionality described above may be stored in storage subsystem 568. By way of example, computer-readable storage media 552 may include non-volatile memory such as a hard disk drive, a magnetic disk drive, an optical disk drive such as a CD ROM, DVD, a Blu-Ray® disk, or other optical media. Computer-readable storage media 552 may include, but is not limited to, Zip® drives, flash memory cards, universal serial bus (USB) flash drives, secure digital (SD) cards, DVD disks, digital video tape, and the like. Computer-readable storage media 552 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 552 may provide storage of computer-readable instructions, data structures, program modules, and other data for computing system 502.

In certain embodiments, storage subsystem 568 may also include a computer-readable storage media reader 550 that may further be connected to computer-readable storage media 552. Together and, optionally, in combination with system memory 560, computer-readable storage media 552 may comprehensively represent remote, local, fixed, and/or removable storage devices plus storage media for storing computer-readable information.

In certain embodiments, computing system 502 may provide support for executing one or more virtual machines. Computing system 502 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 502. Accordingly, multiple operating systems may potentially be run concurrently by computing system 502. Each virtual machine generally runs independently of the other virtual machines.

Communication subsystem 540 provides an interface to other computer systems and networks. Communication subsystem 540 serves as an interface for receiving data from and transmitting data to other systems from computing system 502. For example, communication subsystem 540 may enable computing system 502 to establish a communication channel to one or more client computing devices via the Internet for receiving and sending information from and to the client computing devices.

Communication subsystem 540 may support both wired and/or wireless communication protocols. For example, in certain embodiments, communication subsystem 540 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 540 may provide wired network connectivity (e.g., Ethernet) in addition to or instead of a wireless interface.

Communication subsystem 540 may receive and transmit data in various forms. For example, in some embodiments, communication subsystem 540 may receive input communication in the form of structured and/or unstructured data feeds, event streams, event updates, and the like. For example, communication subsystem 540 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 540 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 540 may also be configured to output the structured and/or unstructured data feeds, event streams, event updates, and the like to one or more databases that may be in communication with one or more streaming data source computers coupled to computing system 502.

Communication subsystem 540 may provide a communication interface 542, e.g., a WAN interface, which may provide data communication capability between the local area network (bus subsystem 570) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 502 may operate in response to requests received via communication interface 542. Further, in some embodiments, communication interface 542 may connect computing systems 502 to each other, providing scalable systems capable of managing high volumes of activity. Conventional or other techniques for managing server systems and server farms (collections of server systems that cooperate) may be used, including dynamic resource allocation and reallocation.

Computing system 502 may interact with various user-owned or user-operated devices via a wide-area network such as the Internet. An example of a user-operated device is shown in FIG. 5 as client computing system 502. Client computing system 504 may be implemented, for example, as a consumer device such as a smart phone, other mobile phone, tablet computer, wearable computing device (e.g., smart watch, eyeglasses), desktop computer, laptop computer, and so on.

For example, client computing system 504 may communicate with computing system 502 via communication interface 542. Client computing system 504 may include conventional computer components such as processing unit(s) 582, storage device 584, network interface 580, user input device 586, and user output device 588. Client computing system 504 may be a computing device implemented in a variety of form factors, such as a desktop computer, laptop computer, tablet computer, smart phone, other mobile computing device, wearable computing device, or the like.

Processing unit(s) 582 and storage device 584 may be similar to processing unit(s) 512, 514 and local storage 522, 524 described above. Suitable devices may be selected based on the demands to be placed on client computing system 504; for example, client computing system 504 may be implemented as a "thin" client with limited processing capability or as a high-powered computing device. Client computing system 504 may be provisioned with program code executable by processing unit(s) 582 to enable various interactions with computing system 502 of a message management service such as accessing messages, performing actions on messages, and other interactions described above. Some client computing systems 504 may also interact with a messaging service independently of the message management service.

Network interface 580 may provide a connection to a wide area network (e.g., the Internet) to which communication interface 540 of computing system 502 is also connected. In various embodiments, network interface 580 may include a wired interface (e.g., Ethernet) and/or a wireless interface implementing various RF data communication standards such as Wi-Fi, Bluetooth®, or cellular data network standards (e.g., 3G, 4G, LTE, etc.).

User input device 586 may include any device (or devices) via which a user may provide signals to client computing system 504; client computing system 504 may interpret the signals as indicative of particular user requests or information. In various embodiments, user input device 586 may include any or all of a keyboard, touch pad, touch screen, mouse or other pointing device, scroll wheel, click wheel, dial, button, switch, keypad, microphone, and so on.

User output device 588 may include any device via which client computing system 504 may provide information to a user. For example, user output device 588 may include a display to display images generated by or delivered to client computing system 504. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 588 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 512, 514 and 582 may provide various functionality for computing system 502 and client computing system 504, including any of the functionality described herein as being performed by a server or client, or other functionality associated with message management services.

It will be appreciated that computing system 502 and client computing system 504 are illustrative and that variations and modifications are possible. Computer systems used in connection with embodiments of the present invention may have other capabilities not specifically described here. Further, while computing system 502 and client computing system 504 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

What is claimed is:

1. A system for processing customer account information related to a customer account before an approval submission to a merchant POS for routing over a legacy routing system comprising:
    a proxy device configured to intercept the customer account information before approval submission to the merchant POS;
    a user device configured to present customer account information to the proxy device;
    a first communication link accessible by the proxy device for communicating information related to the customer account over the Internet;
    a remote computer in communication with the first communication link over the Internet for processing the information related to the customer account and returning submittable account data and for further providing, to an issuer of the customer account, data for a function beyond approval of the customer account for a transaction; and
    a second communication link communicatively linking the proxy device to the merchant POS for providing the submittable account data to the merchant POS.

2. The system of claim 1 further comprising:
    a scanner for capturing an image on a display of the user device corresponding to the information related to the customer account; and
    a third communication link communicatively linking the scanner and the proxy device for providing the information related to the customer account to the proxy device.

3. The system of claim 1 wherein the function comprises one of a coupon, loyalty points, rewards, credits real-time fraud protection and a unique authorization functionality.

4. The system of claim 1 wherein the proxy device comprises a plug-in module on the merchant POS.

5. The system of claim 1 wherein the remote computer is configured to provide an approval from an issuer of the customer account to the proxy device over the Internet and the first communication link, and the proxy device is configured to provide the customer account information to the merchant POS upon receiving the approval.

6. The system of claim 1 wherein the user device comprises a mobile phone.

7. The system of claim 1 wherein the customer account information presented by the user device to the proxy device is in a format not accepted by the merchant POS.

8. The system of claim 7 wherein the format not accepted by the merchant POS comprises a displayed indicia on the user device.

9. The system of claim 8 wherein the displayed indicia comprises a QR code.

10. A system for processing customer account information related to a customer account before an approval submission to a merchant POS for routing over a legacy routing system comprising:
    a proxy device configured to intercept the customer account information before approval submission to the merchant POS;
    a user device configured to present customer account information to the proxy device;
    a first communication link accessible by the proxy device for communicating information related to the customer account over the Internet;
    a remote computer in communication with the first communication link over the Internet for processing the information related to the customer account and returning submittable account data and for further providing, to an issuer of the customer account, data for a function beyond approval of the customer account for a transaction;
    wherein the remote computer is configured to provide an approval from an issuer of the customer account to the proxy device over the Internet and the first communication link, and the proxy device is configured to provide the customer account information to the merchant POS upon receiving the approval;
    a second communication link communicatively linking the proxy device to the merchant POS for providing the submittable account data to the merchant POS;
    wherein the function comprises one of a coupon, loyalty points, rewards, credits real-time fraud protection and a unique authorization functionality; and
    wherein the proxy device comprises a plug-in module on the merchant POS.

11. A system for processing customer account information related to a customer account before an approval submission to a merchant POS for routing over a legacy routing system comprising:
    a proxy device configured to intercept the customer account information before approval submission to the merchant POS;
    a user device configured to present customer account information to the proxy device;
    a first communication link accessible by the proxy device for communicating information related to the customer account over the Internet;
    a remote computer in communication with the first communication link over the Internet for processing the information related to the customer account and returning submittable account data and for further providing, to an issuer of the customer account, data for a function beyond approval of the customer account for a transaction;
    wherein the remote computer is configured to provide an approval from an issuer of the customer account to the proxy device over the Internet and the first communication link, and the proxy device is configured to provide the customer account information to the merchant POS upon receiving the approval;

a scanner for capturing an image on a display of the user device corresponding to the information related to the customer account;
a third communication link communicatively linking the scanner and the proxy device for providing the information related to the customer account to the proxy device;
a second communication link communicatively linking the proxy device to the merchant POS for providing the submittable account data to the merchant POS;
wherein the function comprises one of a coupon, loyalty points, rewards, credits real-time fraud protection and a unique authorization functionality;
wherein the proxy device comprises a plug-in module on the merchant POS; and
wherein the customer account information presented by the user device to the proxy device is in a format not accepted by the merchant POS.

* * * * *